UNITED STATES PATENT OFFICE.

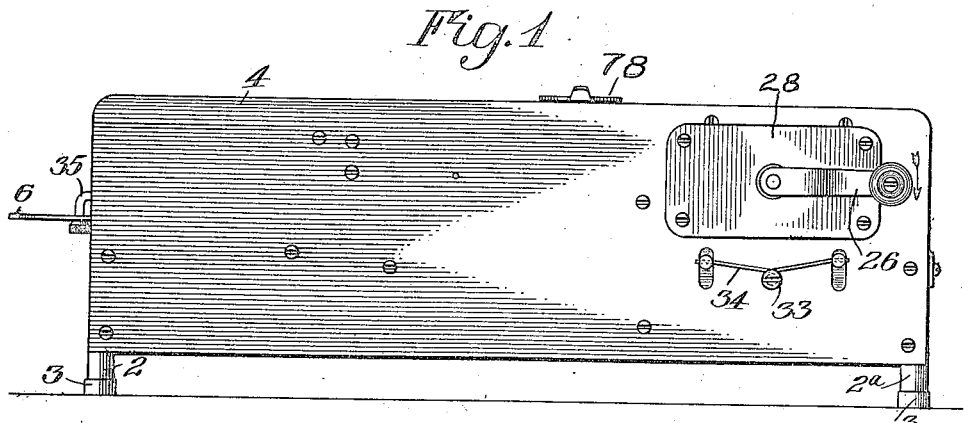
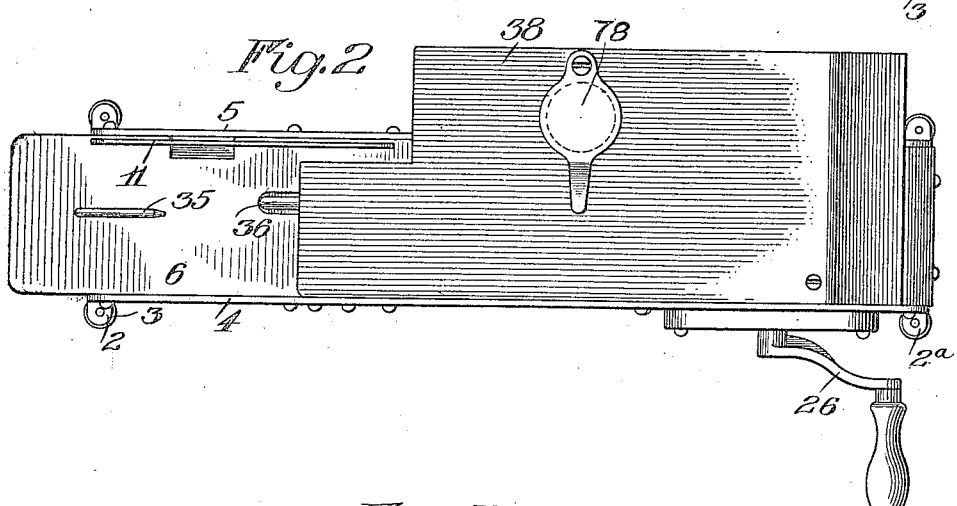
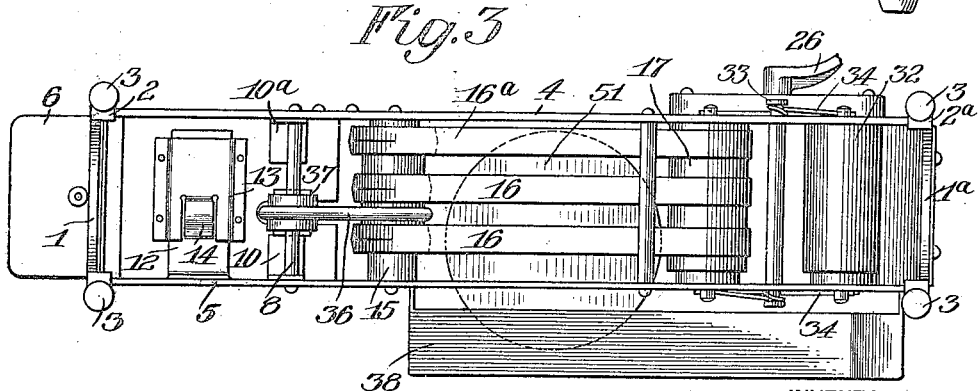

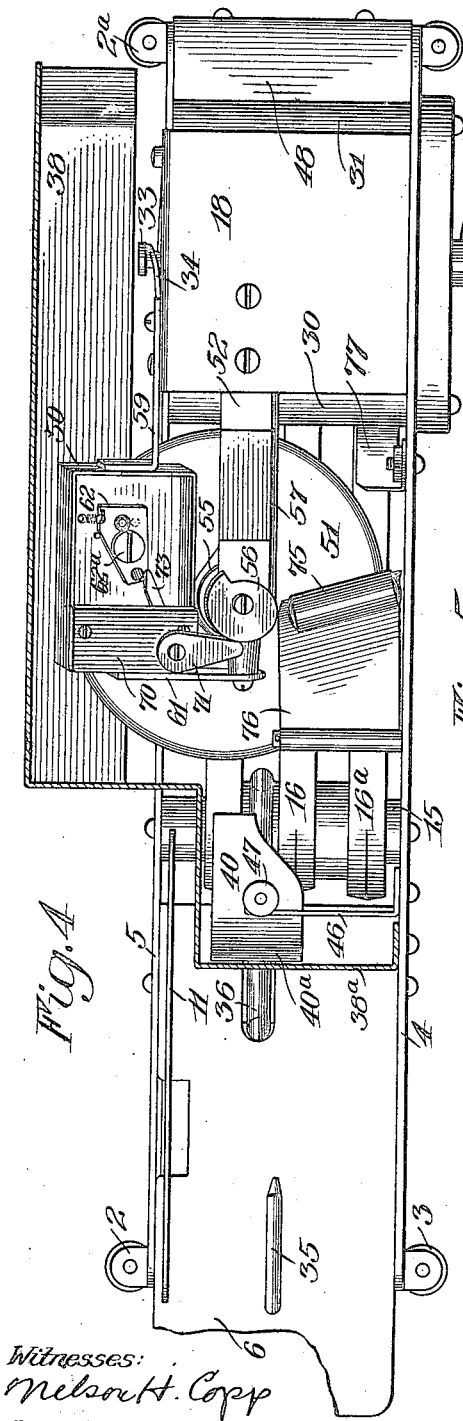

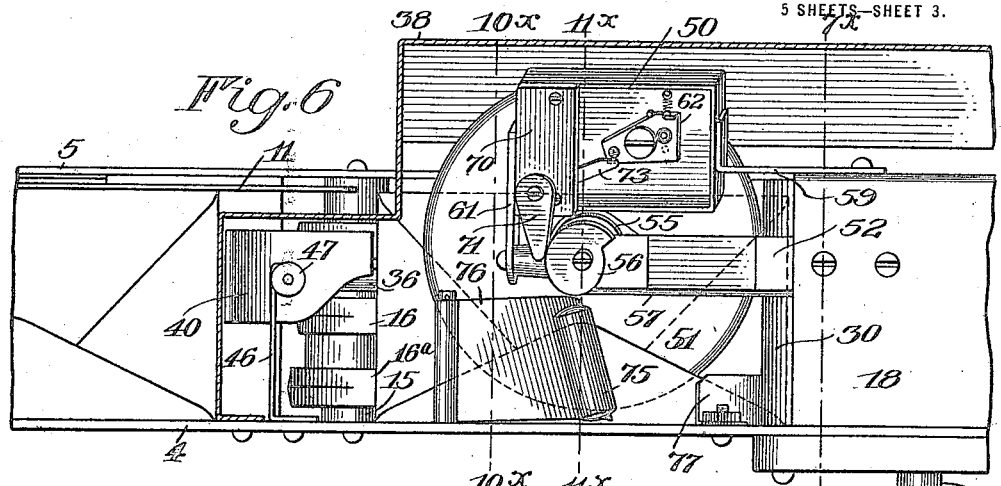
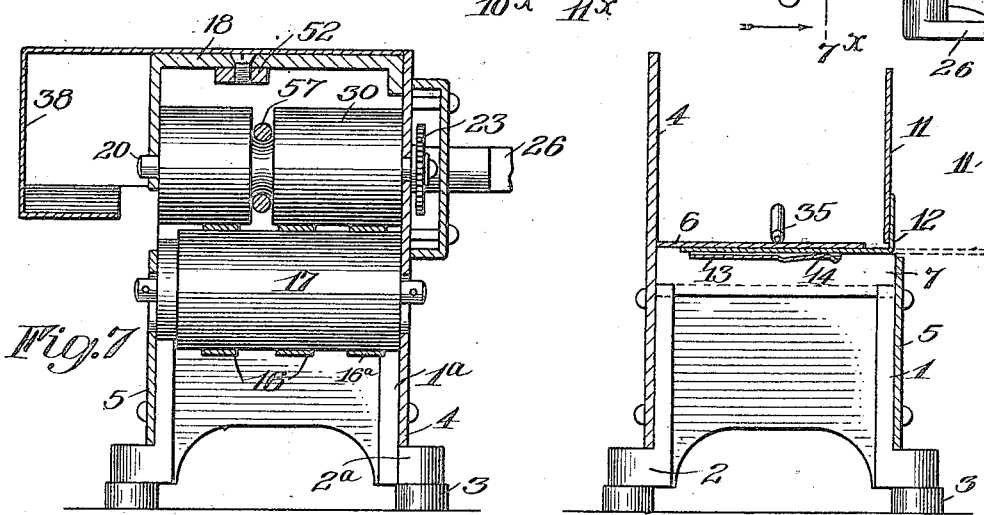
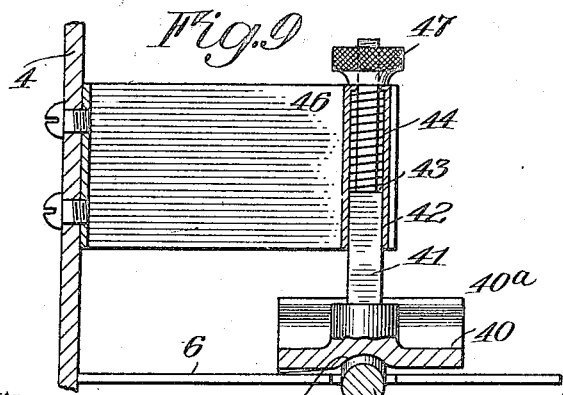
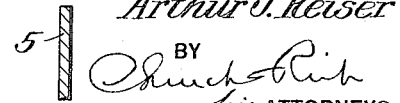

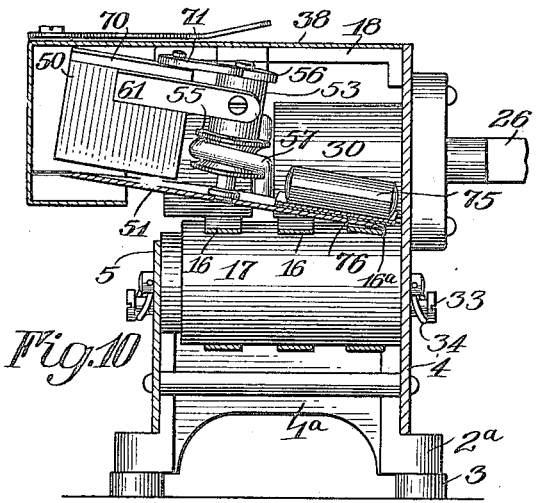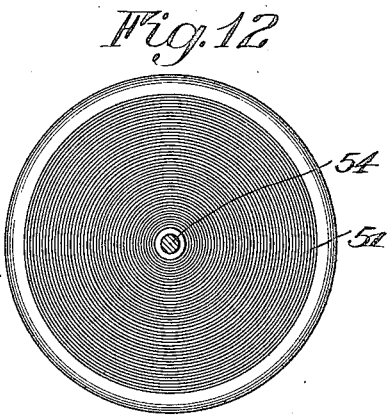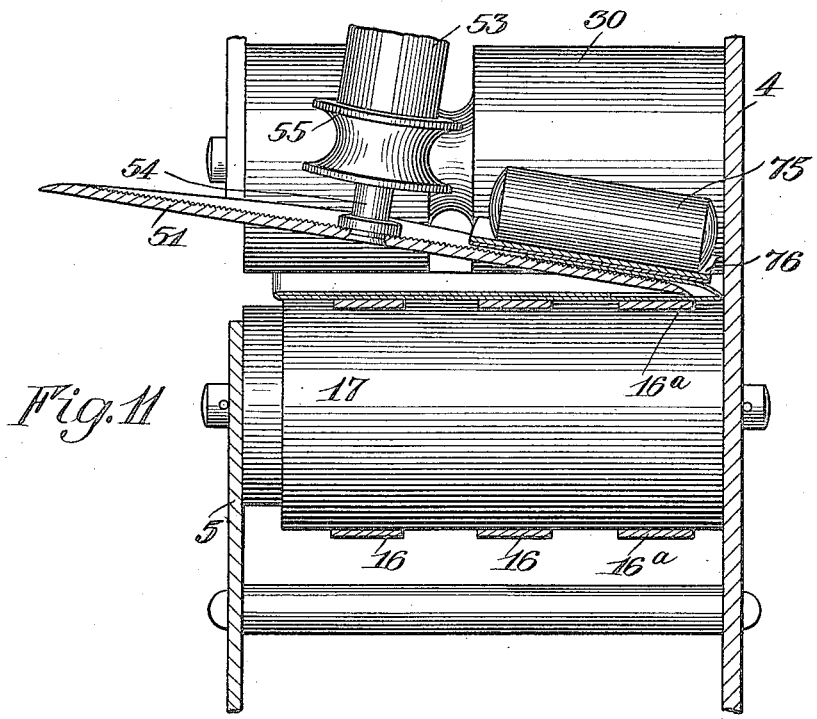

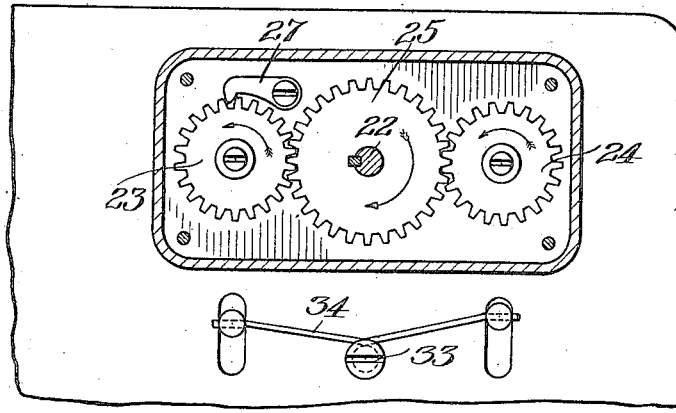
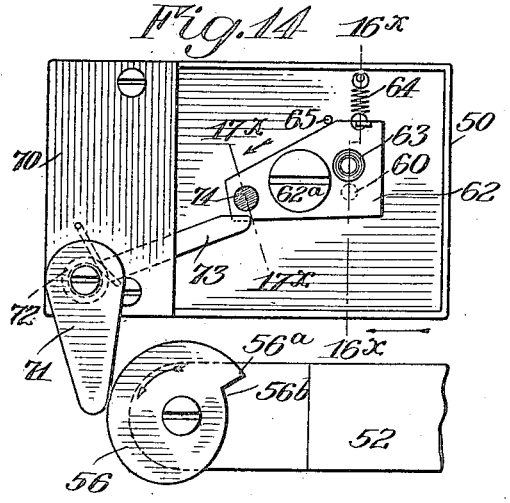
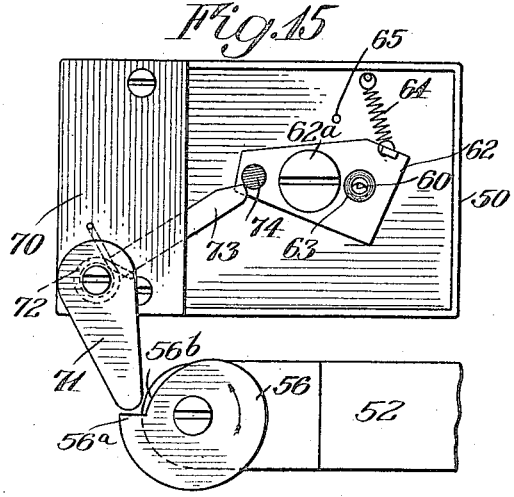
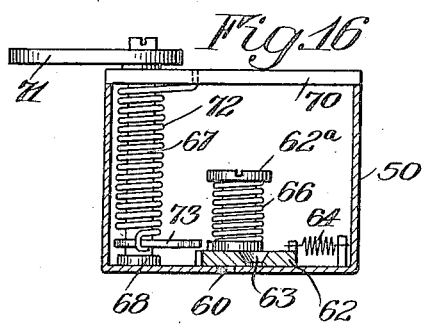
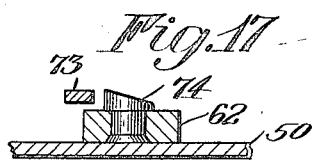

ARTHUR J. KEISER, OF ROCHESTER, NEW YORK, ASSIGNOR TO THE BIRCHER CO., INC., OF ROCHESTER, NEW YORK, A CORPORATION OF NEW YORK.

ENVELOPE-SEALING MACHINE.

1,426,745.   Specification of Letters Patent.   Patented Aug. 22, 1922.

Application filed May 11, 1918.   Serial No. 233,890.

*To all whom it may concern:*

Be it known that I, ARTHUR J. KEISER, of Rochester, in the county of Monroe and State of New York, have invented certain new and useful Improvements in Envelope-Sealing Machines; and I do hereby declare the following to be a full, clear, and exact description of the same, reference being had to the accompanying drawings, forming a part of this specification, and to the reference numerals marked thereon.

My invention relates to machines in which envelopes may be fed from a stack successively into contact with means for raising the flap and applying moisture to the gum thereon, and thereafter pressing the flaps against the envelopes to seal them.

The object of my invention is to make a machine of this kind which is simple in construction, automatic in operation, and which can be readily adjusted to envelopes of various sizes. Another object of my invention is to provide a machine of this kind with a moistening disk mounted to make full contact with the flap of an envelope and which is pressed into contact therewith. To these and other ends the invention consists in certain improvements and combinations of parts, all as will be hereinafter more fully described, the novel features being pointed out in the claims at the end of the specification.

In the drawings:

Figure 1 is a side elevation of one form of machine incorporating the features of my invention;

Figure 2 is a plan view of the same;

Figure 3 is a bottom view of the same;

Figure 4 is a plan view with a part of the cover sectioned away;

Figure 5 is a longitudinal section showing the parts in elevation;

Figure 6 is a view similar to Figure 4, showing an envelope in the machine, the end parts being sectioned away;

Figure 7 is a section on the line $7^x$—$7^x$ of Figure 6, looking in the direction of the arrows;

Figure 8 is a section on the line $8^x$—$8^x$ of Figure 5;

Figure 9 is an enlarged section on the line $9^x$—$9^x$ of Figure 5, parts being broken away;

Figure 10 is a section on the line $10^x$—$10^x$ of Figure 6;

Figure 11 is an enlarged section on the line $11^x$—$11^x$ of Figure 6, with parts broken away;

Figure 12 is a plan view of the moistening wheel removed;

Figure 13 is a detail view showing the driving gears for the feed rollers in elevation, the housing therefor being sectioned away;

Figures 14 and 15 show details of the devices for applying a moistening fluid to the wheel and show the parts in different relations;

Figure 16 is a section on the line $16^x$—$16^x$ of Figure 14, and

Figure 17 is a section on the line $17^x$—$17^x$ of Figure 14.

Similar reference numerals in the several figures indicate the same parts.

The frame of the machine is composed of two end pieces 1 and $1^a$, each provided with a pair of legs 2 and $2^a$ upon which the machine is supported. Each of the legs may be provided with cushioning feet 3 of rubber, felt or the like, to prevent injury to the polished surface of a table or desk on which the machine may be supported. The said end pieces are connected by side pieces 4 and 5 suitably secured near their ends to the end pieces. One of the side pieces 5 extends only slightly above the end pieces and the other piece 4 extends beyond the end pieces to the top of the machine, as clearly shown in the cross sectional views of the drawings. At the front of the machine is provided means for supporting a plurality or stack of envelopes, comprising a plate 6 supported just above the side piece 5 on the end piece 1 by means of a bracket 7 seated in a depression provided therefor in the end piece to prevent movement of the plate longitudinally of the machine. The forward end of the plate is supported on a pulley shaft 8 carried between the side plates by means of depending ears 10 and $10^a$. One side of the stack of envelopes rests against the side plate 4, and the other side of the stack is supported and guided by means of a vertical plate 11 mounted on the plate 6 for lateral adjustment thereon. For this purpose, the vertical plate 11 is carried on an arm 12 extending inwardly beneath the plate 6, where it is slidingly supported in a guideway 13 secured to the under side of the plate 6. For the purpose of holding the plate 11 in adjusted position, a spring plate or finger 14 is struck up from the material of the guideway and frictionally engages the arm 12.

Mounted rearwardly of the plate 6 are devices for feeding, guiding and carrying the envelopes from a pile on the plate to moistening and sealing devices. Supported in the side plates of the frame rearwardly and slightly below the plate 6 is an idler or pulley 15 around which are looped a plurality of endless belts or carriers 16, three being shown in the present embodiment. The belts or carriers extend rearwardly and are looped around a second pulley or roller 17 also revolubly supported in the side plates of the frame. The pulley 15 is driven by the belts 16 which receive their motion from the roller 17. Secured to the side plate 4 of the frame is a bracket 18 which extends horizontally across the top of the machine where it is bent downwardly, and provides a supporting means for one end of each of the pulley shafts 20 and 21 and also for the end of the crank shaft 22. The other ends of each of these shafts is rotatably supported in the side plate 4 of the frame. Each of these shafts extends through the side plate where they are provided with intermeshing pinions or gears 23, 24 and 25 respectively, keyed or otherwise secured to their shafts. The crank shaft 22 extends outwardly beyond the face of the gear 25 and has a crank or handle 26 keyed or otherwise secured to its outer end. When the wheel 25 is turned by the crank in the direction of the arrow shown in Figure 13, motion is simultaneously transmitted to the wheels 23 and 24 in the direction indicated by the arrows. To prevent reverse rotation of the crank and consequent injury to the parts, a dog 27 is pivotally secured to the plate 4 and gravitates into engagement with the teeth of the wheel 23. The construction is such that when the wheel is rotated in the direction of the arrow, the dog is carried from between the teeth of the wheel, but when motion is applied in the opposite direction, the dog engages the teeth and prevents rotation. The toothed wheels or gears 23, 24 and 25, and the locking dog 27 are enclosed in a housing 28 suitably secured to the side plate 4. The shaft 20 is mounted above the roller 17 and carries a roller 30 having a surface of rubber or other suitable material in contact with the belts 16 or the surface of the roller. The shaft 21 carries a roller 31 also having a surface of rubber or other suitable material, and has its surface in engagement with a roller 32 revolubly mounted on a shaft 33 supported in the side plates of the frame. The rollers 17 and 32 are spring pressed into engagement with the cooperating rollers 30 and 31 to be driven by frictional contact with said rollers. For this purpose the shafts of the rollers extend a short distance beyond the side plates and through vertical slots provided therefor in the plates. A shouldered screw 33 is seated in each of the plates midway between said slots and has a wire spring 34 coiled around the same. The opposite ends of the spring may engage the under sides of the adjacent ends of the shafts or preferably extend through perforations provided therefor, as illustrated in the drawings.

In the operation of feeding envelopes by the devices just described, the stack or pile of envelopes is placed on the plate 6 and the plate 11 adjusted to the width of the envelopes. Means are provided for slightly inclining the pile forwardly and downwardly comprising a rod 35 secured in the plate and projecting upwardly therefrom and bent forwardly and downwardly with its forward end in contact with the plate. This rod is so placed as to support the rear end of the pile above the plate while the front end of the pile inclines downwardly into contact with the plate or the feed band 36 projecting through the plate at its forward end. The said feed band is seated in a groove provided therefor in the roller 15 and takes over an idle roller or pulley 37 revolubly mounted on the rod 8. The band is of rubber or other suitable material having a frictional surface and extends through a slot in the forward end of the plate 6 into frictional contact with the forward end of the lowermost envelope in the pile. A cover 38 is provided for the machine, and has a portion 38$^a$ extending substantially vertically downward near the forward end of the plate 6, and serves as a support or guide for the forward ends of the envelopes in the pile. Means are provided for separating and pressing them in contact with the feed band 36. Said means comprises a presser foot or spring pressed plate 40 placed immediately in front of the cover portion 38$^a$ and carried by a stem or rod 41 extending through a housing 42. The stem is provided with a shoulder 43 and an expansion spring 44 is coiled about the stem and engages said shoulder, and at its other end abuts a collar formed in the upper end of the housing. The housing is secured to the frame by means of an arm or plate 46 bent up at its outer end and secured to the side plate 4 by means of screws or otherwise. At its forward end that faces the stack of envelopes, the presser 40 is curved upwardly at 40$^a$, as best shown in Figure 5, to direct the envelopes passing beneath the member 38$^a$ downwardly, thus holding the lowermost envelope in contact with the feed band 36. At the base of the curved portion 40$^a$ of the presser 40 is provided a shoulder 40$^b$ which serves to retard or prevent feeding forwardly of the envelopes in contact with the lowermost envelope in the pile. The bottom of the presser is provided with a groove 40°, as seen in Figure 9. adjacent the feed band 36 and the presser is adjustable vertically to compensate for envelopes of different thicknesses. For the purpose of adjusting the presser, the upper end of the stem 41 is threaded and receives a knurled nut 47 abutting the upper end of the housing. The lowermost envelope is engaged and fed forwardly past the presser, permitting the next succeeding envelope to fall into contact with the feed band and is fed immediately behind the first envelope. The feed band 36 carries the envelope past the presser foot where it emerges on the feed belts or bands 16 which continue its forward movement. While moving forwardly on the bands the gum on the flap of the envelope is moistened by devices which cooperate to feed the envelope. The bands carry the envelope to a point where it is gripped first between the roller 30 and the feed bands and then between the rollers 31 and 32. These last rollers firmly press the flap into engagement with the body of the envelope and insure adhesion between them. From the rollers 31 and 32 the sealed envelopes emerge from the machine. A guide or guard plate 48 may be secured to the frame to prevent the sealed envelopes from falling into the space between the roller 32 and the end of the frame.

The devices for moistening the gum on the flaps of the envelopes comprises a reservoir 50 for containing water or other moistening liquid and a revolving wheel or disk 51 which passes between the body of the envelope and its flap and applies moisture to the gum on the flap. Extending forwardly from the bracket or support 18 and rigidly secured thereto is an arm or bracket 52, which has a bearing 53 near its forward end for the shaft 54 of the moistening disk 51. This shaft is inclined upwardly, forwardly and laterally toward the frame member 4 and carries the moistening disk 51 at its lower end. The disk is disposed at substantially right angles to the axis of its shaft and inclines from the horizontal downwardly toward the side piece 4 and slightly forwardly toward the feeding-in end of the machine, and at its edge adjacent the side plate 4 contacts with the feed band 13$^a$. Adjacent the lower end of the bearing 53 the shaft 54 is provided with a pulley 55, and at its upper end has a spiral shaped cam member 56 secured thereto to revolve therewith and bears against the upper end of the bearing 53. The spiral shaped cam member 56 has a shoulder 56$^a$, the purpose of which will be presently described. An endless pulley belt 57 is looped around the pulley 55 and the roller 30 which may have a groove provided therefor in its surface. Motion is transmitted thereby from the roller to the moistening wheel which is rotated when the feed roller is revolved. An idle pulley 58 has a bearing on a support depending from the arm or bracket 52 and engages the belt to guide the same and press it into frictional engagement with its pulleys.

The reservoir 50 is supported over the outer side of the disk 51 by means of the bracket 59 secured to the side of the bracket 18 and an arm 61 secured to the end of the bracket 52. As seen in Figure 10, the bottom of the reservoir is substantially parallel with the surface of the moistening disk. In the bottom of the reservoir is an outlet opening 60 which is normally closed by means of a plate 62 pivoted to the bottom of the reservoir by suitable means, as by a screw 62$^a$. The plate or shutter 62 has an opening 63 adapted to move into register with the opening 60 when it is moved on its pivot. A spring 64 connecting the plate with a lug fixed in the reservoir normally maintains the plate in contact with a fixed pin or stop 65, in which position the openings are out of register, and the opening 60 is then closed by the shutter and the liquid in the reservoir cannot escape through the outlet 60. The liquid which escapes through the opening 60 falls directly upon the upper surface of the disk 51 near its outer edge, and the inclined position of the disk causes the liquid to flow over the surface thereof. In order to prevent leakage, the screw 62$^a$ may be extended above the plate and an expansion spring 66 interposed between the surface of the plate and the head of the screw, said spring operating to hold the plate resiliently in contact with the bottom of the reservoir.

Means are provided for automatically applying the moisture to the disk 51 when an envelope is being fed through the machine and said disk is rotated. Revolubly mounted in the reservoir is a post or shaft 67, which has bearings in a collar 68 secured to the bottom of the reservoir and in a plate 70 extending across the top and secured to the reservoir. Secured to the upper end of the shaft outside of the plate 70 is a cam 71 adapted to cooperate with the spiral cam 56 on the revolving shaft 54. A spring 72 is coiled about the shaft 67 within the reservoir and having one end anchored in the plate 70 serves to resiliently maintain the cam 71 in contact with the spiral cam. The construction is such that as the spiral cam 56 is rotated, the cam 71 rides up on its surface against the tension of its spring until it reaches the shoulder 56$^a$, when its spring moves it suddenly against that part of the spiral 56$^b$ having the shortest radius. By this construction, a slow movement is imparted to an arm 73 in one direction and a quick sudden movement in the opposite direction. The arm 73 is mounted on the shaft 67 near its bottom and cooperates with a lug 74 on the shutter to reciprocate the same to bring the opening 63 into register with the outlet 60, once at each reciprocation. The lug or post 74 is beveled at its upper end to provide a cam which moves the arm 73 against its own resiliency over the lug in its slow movement during which time the shutter remains stationary in contact with its stop 65. However, on the quick return movement of the arm, it strikes the periphery of the lug on the higher side and kicks the shutter to bring the openings 60 and 63 into register, permitting liquid to flow from the reservoir onto the disk. It will be noted that the plate 62 moves at substantially the same speed at each actuation thereof and opens the outlet 60 for substantially the same interval of time, thus permitting a fixed and determinable amount of moisture to flow onto the moistening wheel at each actuation.

As the envelopes are fed onto the belts or bands 16, the flap is picked up by the revolving disk 51, which, for this purpose, may be beveled at its outer edge, as shown in the drawings. The envelope now moves forwardly with the disk between its flap and body, and the flap is pressed into contact with the upper moistened surface of the disk by means of a weight 75 carried on a guide or sheet metal arm 76 loosely pivoted on a post projecting inwardly from the part 4 of the frame. The weight 75 rests on the disk or on the flap of an envelope thereon and serves to press the flap firmly in contact with the disk to insure the moistening of the gum on the flap. The disk rotates relatively to the flap and may be corrugated or roughened on its upper surface, as indicated in the drawings, to insure the breaking of the hardened surface of the gum and the thorough moistening thereof.

In order to guide the advancing envelopes between the rollers 17 and 30 and prevent fouling, a guide 77 may be secured to the plate 4 in such a position as to direct the envelope between said rollers. To facilitate the refilling of the reservoir, the cover 38 of the machine may be provided with an opening directly over the open upper side of the reservoir through which water or other liquid may be poured into the reservoir. To improve the appearance of the machine and to protect the reservoir from dust and dirt, the opening in the cover may be kept normally closed by means of a pivoted disk or cover 78, which may be moved from over the opening during the refilling operation.

I claim as my invention:

1. In an envelope sealing machine the combination of a table for a stack of envelopes, means for separating and carrying the envelopes from the stack, flap uppermost comprising a traveling belt, a revoluble disk having its edge located in proximity to said belt serving to separate the flap from the body of the envelope during the movement of the latter, means for supplying moisture to the upper surface of the disk and a pair of rollers for pressing the flap into contact with the body of the envelope.

2. In an envelope sealing machine, the combination of a feed table for supporting a stack of envelopes, traveling means for separating an envelope from the stack, flap uppermost and supporting the same during the sealing operation, a revoluble disk having its edge in proximity to the supporting and feeding means adapted to separate the flap from the body of the envelope, means for applying moisture to the upper side of the disk, means for pressing the flap of the envelope into contact with the disk, and a pair of rollers for pressing the flap into contact with the body of the envelope.

3. In an envelope sealing machine the combination of a feed table for a stack of envelopes, a traveling carrier for separating an envelope from the stack and supporting and conveying it flap upward during the sealing operation, means for applying moisture to the underside of the flap, and driven pressing devices for pressing the flap into contact with the envelope body after leaving the carrier.

4. In an envelope sealing machine the combination of a feed table for a stack of envelopes, a traveling yielding carrier for separating envelopes from the stack and conveying them flap upward, a revolving disk having its edge arranged in proximity to the carrier, and its upper surface engaging the flap of an envelope on the carrier, means for applying moisture to the upper surface of the disk and means for pressing the flap of the envelope into contact with the body thereof.

5. In an envelope sealing machine, the combination of a traveling envelope carrier, a revoluble disk having a substantially flat surface and its axis of rotation inclined forwardly and laterally relatively to the plane of the carrier and its edge in proximity to the surface thereof, means for applying moisture to the upper surface of the disk, means for pressing the envelope flap in contact with the disk and means for pressing the moistened flap in contact with the body of the envelope.

6. In an envelope sealing machine, the combination of envelope feeding means, means for separating and applying moisture to the flap of an envelope comprising a disk revolving at a greater surface speed than the forward movement of the envelope, means for pressing the flap into contact with the surface of the disk, and means for pressing the flap into contact with the body of the envelope.

7. In an envelope sealing machine, the combination of means for feeding an envelope, a revoluble disk for moistening an envelope flap while being moved by the feeding means, said disk having its upper surface slightly inclined relative to a horizontal plane, means for supplying moisture in measured quantities to the upper surface of the disk at each revolution of the latter.

8. In an envelope sealing machine, the combination with envelope feeding means, a revolving disk having its upper surface slightly inclined relative to the plane of the feeding device, means for supplying moisture in measured quantities to the upper surface of the disk, comprising a reservoir having an outlet, a movable apertured member controlling said opening and connections between the apertured member and disk for operating the former at each revolution of the latter.

9. In an envelope sealing machine, the combination of means for separating and feeding the envelopes, comprising means for supporting a stack of envelopes inclined forwardly and downwardly with the flaps thereof arranged upwardly, an endless belt frictionally engaging the lowermost envelope in the stack, means for pressing the envelope into engagement with the belt and preventing forward movement of the next succeeding envelope, means arranged above the plane of the belt for moistening the underside of the overlapping flap of the envelope, and means for pressing the flap into contact with the body of the envelope.

10. In an envelope sealing machine, the combination of means for separating and feeding the envelopes, comprising means for supporting a stack of envelopes inclined forwardly and downwardly, an endless belt frictionally engaging the lowermost envelope in the stack, a yieldable presser foot for separating the envelope from the stack and engaging it with the belt, and means for varying the normal position of the presser foot, means arranged above the plane of the belt for moistening the underside of the overlapping flap of the envelope, and means for pressing the flap into contact with the body of the envelope.

11. In an envelope sealing machine, the combination with a support for a stack of envelopes, an endless belt for engaging and feeding forwardly the lowermost envelope of the stack flap uppermost, an endless carrier, and means cooperating therewith to feed the envelope and moisten the flap thereof.

12. In an envelope sealer, the combination with a rotary flap moistening disk, a flap holder and means for supplying moisture to the upper surface of the disk, of an envelope carrier comprising a belt supporting the envelopes from below and yieldingly pressing the envelope body against the side of the disk opposite said moisture applying means, and means for pressing the flap upon the body of the envelope.

13. In an envelope sealer, the combination with a rotary flap moistening disk having a roughened surface, a flap holder and means for applying moisture to the upper surface of the disk, of an envelope carrier comprising a belt supporting the envelopes from below and yieldingly pressing the envelope body against the side of the disk opposite said moisture applying means and means for pressing the flap upon the body of the envelope.

14. In an envelope sealer, the combination with a yielding envelope carrier, of a rotary flap moistener disk having substantially plane surfaces and inclined toward the feeding end of the carrier and toward one side thereof, and one edge of the disk engaging the body of an envelope on the carrier, means for moistening the surface of the disk opposite the carrier, a flap holder on the same side of the disk and means for pressing the flap on the body of the envelope.

15. In an envelope sealer, the combination with a yielding envelope carrier comprising a belt, of a rotary flap moistening disk having substantially plane surfaces arranged over the carrier with its axis inclined laterally to the plane of movement of the carrier, means for supplying moisture intermittently to the surface of the disk opposite the carrier, a flap holder operating against the disk and means for pressing the flap upon the body of the envelope.

16. In an envelope sealer, the combination with a traveling envelope carrier, of a rotary flap moistening disk arranged over the carrier and having its upper surface inclined laterally of the plane of movement of the carrier for engagement with the gummed surface of the envelope, a liquid receptacle and means actuated in timed relation with the rotation of the disk to feed moisture from the receptacle to the upper surface thereof at each rotation.

17. In an envelope sealer, the combination with an envelope carrier, a rotary flap moistening disk arranged above the carrier, a liquid receptacle having a discharge opening for supplying liquid to said disk, an automatic valve or shutter controlling said opening, an oscillatory member actuated at each revolution of the disk and a latch connection between said member and the valve for causing the operation of said valve when said oscillatory member is moved in one direction.

18. In an envelope sealer, the combination with an envelope carrier, of a rotary envelope flap moistening disk cooperating with the carrier, a liquid receptacle having a discharge opening arranged over the disk and a valve controlling it, an oscillatory member for actuating the valve in one direction and a cam connected to the disk for effecting operation of said oscillatory member by the rotation of said disk.

19. In an envelope sealer, the combination with an envelope carrier, of a rotary envelope flap moistening disk thereon arranged over the carrier, a liquid receptacle having an opening arranged for the discharge of liquid on said disk, an automatic valve for the opening, a spring operated member, a latch connection between said member and the valve, and a cam connected to the disk for operating the member in one direction.

20. In an envelope sealing machine, the combination of a frame, means for supporting a stack of envelopes thereon, means for separating and feeding an envelope from the stack, a disk for separating the flap from the body of the envelope, a revoluble shaft on which said disk is mounted, a reservoir over said disk having an outlet opening, a shutter normally closing said opening, a beveled post on said shutter, a reciprocating arm pivoted in said reservoir and adapted to cooperate with said post, and means for actuating said arm, the construction being such that when the arm is actuated in one direction it engages the beveled side of the post and springs idly thereover, but when actuated in the opposite direction, it actuates the shutter to permit liquid to flow from the reservoir.

21. In an envelope sealing machine, the combination of a frame, means for supporting a stack of envelopes thereon, means for separating and feeding an envelope from the stack, a disk for separating the flap from the body of the envelope, a revoluble shaft on which said disk is mounted, a reservoir over said disk having an outlet opening, a shutter normally closing said opening, a shaft revolubly mounted in said reservoir, an arm on said shaft adapted to actuate said shutter, a second arm on said shaft, a spring for turning the shaft in one direction, and a spiral cam on said first mentioned shaft adapted to cooperate with said last mentioned arm to reciprocate the shaft and actuate the shutter.

22. In an envelope sealing machine, the combination of a frame, means for supporting a stack of envelopes thereon, means for separating an envelope from the bottom of the stack and feeding it forwardly in a horizontal position, a revoluble disk inclined forwardly and downwardly relatively to the plane of movement of the envelope and having a beveled edge for separating the flap from the body of the envelope, means for intermittently applying moisture, to the upper side of said disk for moistening the flap of the envelope, and means for pressing the flap into contact with the body of the envelope.

23. In an envelope feeding machine, the combination of a frame, means for supporting a stack of envelopes thereon, a feed band engaging the underside of the lowermost envelope of the stack, a spring depressed stop plate having a shoulder thereon and a groove therein cooperating with said band for separating the lowermost envelope from the stack and feeding it forwardly, a plurality of feed bands to which the envelope is fed, and a rotary flap moistening disk cooperating therewith for feeding the envelope forwardly and moistening the flap thereof.

24. In an envelope feeding machine, the combination of a frame, means for supporting a stack of envelopes thereon, means for separating an envelope from the stack, a plurality of feed bands on which the envelope is received, a revoluble disk inclined laterally into contact with one of said bands and cooperating therewith to feed the envelope forwardly, said disk being adapted to engage the envelope between the flap and body thereof, and means for applying moisture to said disk.

25. In an envelope sealer, the combination with a receptacle for a stack of envelopes, and a stop plate at the lower forward edge thereof having a shoulder thereon in proximity to the support and a groove therein extending in the direction of feed, of a movable feed member operating in the groove of the stop plate, a horizontally movable yielding envelope carrier for receiving the envelopes removed from the receptacle, a flap moistener arranged over the carrier, and means for pressing the moistened flap on the body of the envelope

ARTHUR J. KEISER